US012050612B2

(12) United States Patent
Paredes et al.

(10) Patent No.: US 12,050,612 B2
(45) Date of Patent: Jul. 30, 2024

(54) GENERATION AND USE OF TOPIC GRAPH FOR CONTENT AUTHORING

(71) Applicant: Graphite Growth, Inc., San Francisco, CA (US)

(72) Inventors: Jose Luis Paredes, Buenos Aires (AR); Marcos Ciarrocchi, Miami, FL (US); Gregory Druck, San Francisco, CA (US)

(73) Assignee: Graphite Growth, Inc., San Francisco, CA (US)

( * ) Notice: Subject to any disclaimer, the term of this patent is extended or adjusted under 35 U.S.C. 154(b) by 0 days.

(21) Appl. No.: 17/895,863

(22) Filed: Aug. 25, 2022

(65) Prior Publication Data

US 2023/0061289 A1    Mar. 2, 2023

Related U.S. Application Data

(60) Provisional application No. 63/237,532, filed on Aug. 27, 2021.

(51) Int. Cl.
*G06F 16/2457*     (2019.01)
*G06F 16/28*       (2019.01)
*G06Q 30/0201*     (2023.01)

(52) U.S. Cl.
CPC ...... *G06F 16/24578* (2019.01); *G06F 16/285* (2019.01); *G06Q 30/0201* (2013.01)

(58) Field of Classification Search
CPC ............ G06F 16/24578; G06F 16/248; G06F 16/285; G06F 16/3344; G06F 16/9038; G06F 16/953; G06F 18/22; G06F 18/23
See application file for complete search history.

(56) References Cited

U.S. PATENT DOCUMENTS 9,336,269 B1 * 5/2016 Smith ................... G06F 16/951
9,659,084 B1 * 5/2017 Zhang .................... G06F 3/048
(Continued)

FOREIGN PATENT DOCUMENTS

JP         2010118021 A     5/2010

OTHER PUBLICATIONS

PCT International Search Report and Written Opinion, PCT Application No. PCT/IB2022/057990, Dec. 5, 2022, 11 pages.
(Continued)

*Primary Examiner* — Robert W Beausoliel, Jr.
*Assistant Examiner* — Cheryl M Shechtman
(74) *Attorney, Agent, or Firm* — Fenwick & West LLP

(57) ABSTRACT

A system generates a topic graph based on the SERP data for high-ranking keywords in a search engine. Clustering may be based on (for example) degrees of intersection between links in search results of keywords from the SERP data, or keyword embeddings on the SERP data. The topic graph loosely clusters the keywords, such that the keywords have at least a threshold degree of similarity to their clusters, but not necessarily to all the other keywords in the cluster. As a consequence of the loose clustering, a given topic contains keywords that represent different aspects of the same concept, such that a content viewer would likely be interested in a piece of content that addresses the different aspects, and a search engine would be more likely to highly rank the content within its search results for one of the keywords. The system may also provide a user interface permitting a user to browse and filter the topics in the topic graph according to search criteria, as well as to see the topics ordered according to topic ROI estimates computed by the system.

27 Claims, 3 Drawing Sheets

(56) References Cited

U.S. PATENT DOCUMENTS

| | | | |
|---|---|---|---|
| 9,715,495 B1* | 7/2017 | Tacchi | G06F 40/30 |
| 2003/0120630 A1* | 6/2003 | Tunkelang | G06F 16/355 |
| 2011/0231347 A1* | 9/2011 | Xu | G06F 16/951 |
| | | | 706/50 |
| 2014/0317104 A1 | 10/2014 | Isaacs et al. | |
| 2016/0034757 A1 | 2/2016 | Chhichhia et al. | |
| 2016/0125087 A1* | 5/2016 | Mallah | G06F 16/90332 |
| | | | 705/14.54 |
| 2016/0224686 A1* | 8/2016 | Ramanathan | G06F 16/951 |
| 2017/0011039 A1* | 1/2017 | Spaulding | G06F 16/9024 |
| 2017/0300535 A1* | 10/2017 | Papineni | G06F 16/9535 |
| 2018/0096067 A1 | 4/2018 | Tober et al. | |
| 2018/0336202 A1* | 11/2018 | Jahanbakhsh | G06F 16/248 |

OTHER PUBLICATIONS

Reeves, S. "Topic Clusters Won't Save You: How to Focus & Prioritize." Ardent Growth, May 2021, 14 pages, [Online] [Retrieved Dec. 6, 2022], Retrieved from the Internet <URL:https://ardentgrowth.com/blog/keyword-topic-clusters-wont-save-you/>.

* cited by examiner

GENERATION AND USE OF TOPIC GRAPH FOR CONTENT AUTHORING

RELATED APPLICATIONS

This application claims the benefit of Provisional Application No. 63/237,532, filed on Aug. 27, 2021, which is incorporated herein by reference.

FIELD OF ART

This disclosure relates generally to the field of computer networks, and more specifically, to analysis of user queries for network content and categorization and use of content topics.

BACKGROUND

Content authors, such as businesses or individuals, create content such as web pages or other documents for the consumption of viewers over the internet or other wide area network. In most cases, viewers learn of the existence of the authors' content through the use of an internet search engine, which accepts a query for content from a viewer and returns a ranked list of search results containing links to content deemed relevant by the search engine based on its indexing algorithms. The exact ranking criteria of a given search engine are not usually public and may be unintuitive. In consequence, the content of many authors may never be ranked highly enough within the search results of a search engine to be seen by many viewers, even when it would be applicable and useful to them.

SUMMARY

A system generates a topic graph based on search engine results page (SERP) data for high search volume keywords in a search engine. Clustering of keywords may be based on different techniques, such as degrees of intersection between links in search results of keywords from the SERP data, or similarity of keyword embeddings on SERP data. The topic graph loosely clusters the keywords, such that the keywords have at least a threshold degree of similarity to their clusters, but not necessarily to all the other keywords in the cluster. As a consequence of the loose clustering, a given topic contains keywords that represent different aspects of the same concept, such that a content viewer would likely be interested in a piece of content that addresses the different aspects, and a search engine would be more likely to highly rank the content within its search results for one of the keywords. The system may also create sub-clusters within a given cluster using a different clustering algorithm that incorporates natural language operations on the keywords in the cluster; the sub-clusters may represent sub-concepts to discuss within sub-sections of a piece of content in order to interest a viewer and to cause a search engine to rank the content more highly within its search results. Thus, the viewer can proceed from a more general view of a cluster to a more detailed view of a specific portion of the cluster. The system may also provide a user interface permitting a user to browse and filter the topics in the topic graph according to search criteria, as well as to see the topics ordered according to topic return on investment (ROI) estimates computed by the system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
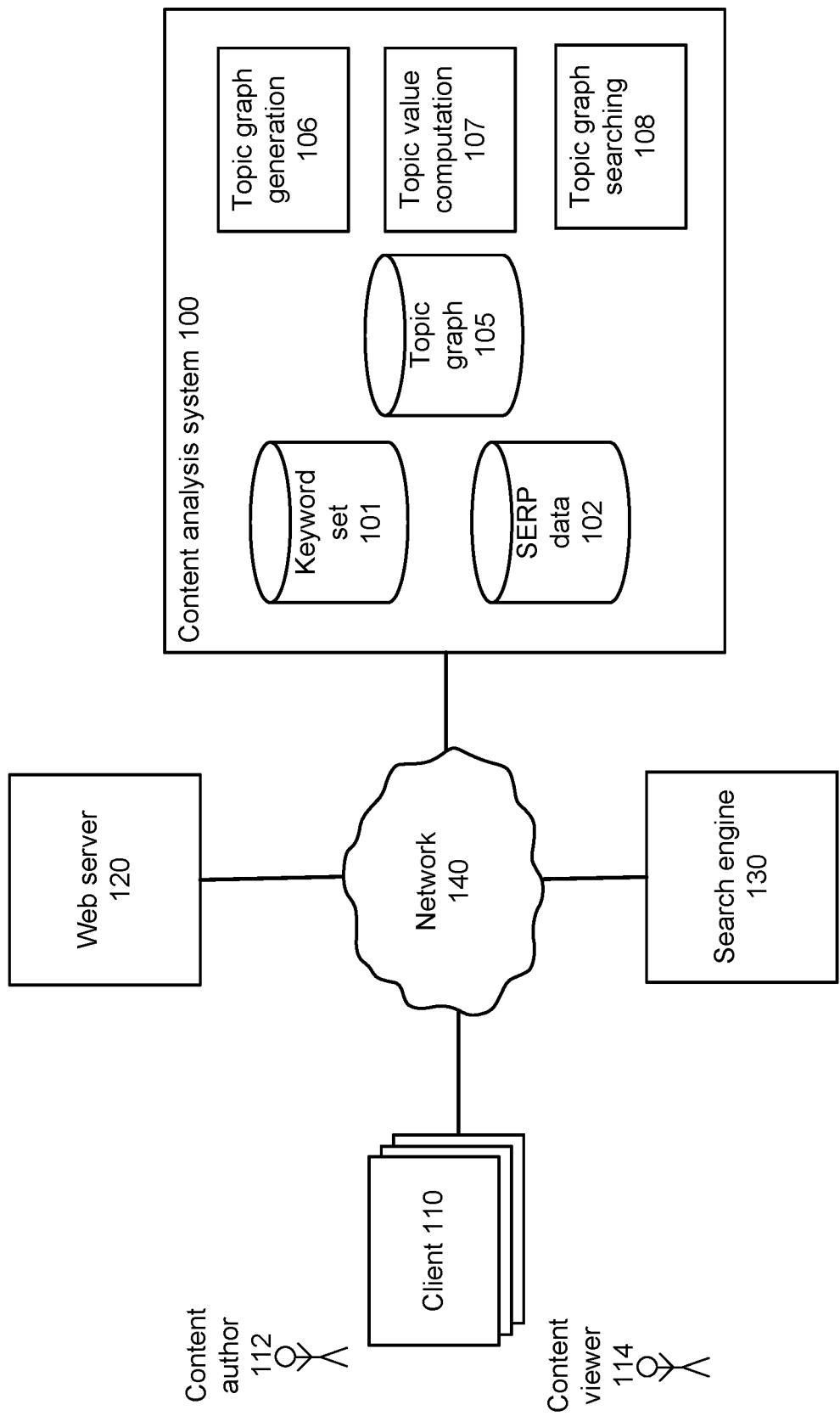
FIG. 1 illustrates a view of an environment in which content viewers view content over a wide-area network, according to one embodiment.

FIG. 1 illustrates a view of an environment in which content viewers view content over a wide-area network, according to one embodiment. Content authors 112, such as businesses or individuals, create items of content, such as web pages or other documents, and provide them to content viewers 114 over a network 140 via a web server 120 or similar server system. Content viewers 114 typically navigate to the authors' content by querying a search engine 130, such as Google™ or Bing™, obtaining a list of search results from the search engine, and clicking on the links (typically those higher in the list) to read the corresponding content. A content analysis system 100 analyzes the prior queries and corresponding search results for a given search engine 130 in order to generate information about the most effective manner in which to present information for given subject matter. These various components are now described in additional detail.

The content authors 112 and content viewers 114 use client devices 110s to create and/or view content such as web pages or other documents. The client devices 110 are computing devices such as smart phones, laptop computers, desktop computers, or any other device that can display digital content (e.g., via a web browser) and communicate over a computer network.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

It is appreciated that there may be any number of content authors 112, content viewers 114, or client devices 110, although only several are illustrated in FIG. 1 for the sake of simplicity. Similarly, there may be any number of web servers 120 and search engines 130.

The content analysis system 100 takes as input a set of keywords 101 and a set of search engine results page (SERP) data 102 corresponding to the search engine 130 to which content is to be targeted. The keywords 101 represent high search volume keywords (that is, keywords included in the queries of many different viewers 114) for the search engine 130 at some prior point in time. Keywords may be individual words (e.g., "salmon"), or multi-word phrases (e.g, "how to cook salmon"). The SERP data 102 include <query, results> pairs, where the query is what a viewer entered into the search engine 130 during a particular search, and the results are an ordered list of links to web pages returned by the search engine in response to that particular query (or other content related thereto, such as web page titles, search snippets, or related searches). The SERP data 102 include queries for the various keywords in the set of keywords 101. The content analysis system 100 may obtain the keyword set 101 and the SERP data 102 in various ways. For example, the keyword set 101 may be obtained using an API of the search engine 130, or through automated examination of the auto-suggested keywords of the search engine, and the SERP data 102 may be obtained through purchase from a separate provider, or by running queries and logging the queries and their results in an automated fashion.

Based on the keyword set 101 and the SERP data 102, a topic graph generation module 106 of the content analysis system 100 generates a topic graph 105 that organizes the various keywords 101 into groups, called "topics." The clustering (e.g., via the similarity function employed) is designed to allow for a somewhat loose affiliation of keywords, in that although a given keyword should be similar to the other keywords in the cluster, as a whole, it need not be highly similar to every other keyword in the cluster. For example, the keywords "401k", "what is a 401k", "401k contribution limit", and "401k vs IRA" might appear in the same topic cluster, linked together through the keyword "401k", even if the similarity between "401k contribution limit" and "401k vs IRA" is not high.

Before generating the keyword groups, the topic graph generation module 106 generates an intermediate keyword graph in which each node represents one of the keywords, and edges between the nodes are weighted by similarities between keywords.

In some embodiments, the similarity function is based at least in part on the degree of intersection of the search results of keywords—that is, the number or percentage of links that are in both result lists-when quantifying the degree of similarity between one keyword and a topic cluster of one or more keywords. For example, in one embodiment, the similarity between a keyword k and a topic t is: sim(k, t)=#intersection(results(k), results(t))/#results(k), where results(t)=union(results($k_i$)) for each keyword $k_i$ in t.

In other embodiments, the similarity function is defined for a pair of keywords, rather than a keyword and a cluster. For example, in one embodiment the similarity of a pair of keywords is defined as the size of the intersection of the result lists for the keywords, divided by the size of the union of the results lists for the keywords. That is, sim($k_1$, $k_2$)=#intersection(results($k_1$), results($k_2$))/#union(results($k_1$), results($k_2$)).

In other embodiments, the similarity function is defined for a pair of keywords, and the similarity of a given pair is defined in terms of their SERP embeddings. For example, in one embodiment sim($k_1$, $k_2$)=cosineSim(embed(SERP($k_1$)), embed(SERP($k_2$))), where SERP(k) is the SERP for keyword k, embed(S) is an embedding for given sections of the SERP S (e.g., for the SERP page titles, snippets, and domains), and cosineSim($e_1$, $e_2$) is the cosine similarity of the embedding vectors $e_1$ and $e_2$.

In one embodiment, clustering is done iteratively and greedily, as in the following pseudocode of Listing 1:
Listing 1
    topics=[ ]
    for k in keywords:
        sim_topics=[ ]
        for t in topics:
            s=sim(k, t)
            if s>MIN_SIM:
                sim_topics.append(s)
        #no similar cluster found; make a new one
        if len(sim_topics)==0:
            t=topic( )
            t.add_keyword(k)
            topics.append(t)
        else:
            i=argmax(sim_topics)
            topics[i].add_keyword(k)

where "sim(k,t)" is the similarity function, and "topics" is the current set of topic clusters. After the above clustering operations, the keyword overlap of all pairs of initial topics is computed, and topics with keyword overlap above a threshold are merged, as in Listing 2:
Listing 2
    for t1, t2 in pairs(topics):
        if sim_keywords(t1, t2)>MIN_MERGE_SIM
            merge(t1, t2)

where sim_keywords(t1, t2)=intersection(t1.keywords, t2.keywords)/min(len(t1.keywords), len(t2.keywords)), and where MIN_MERGE_SIM represents a threshold degree of similarity.

In a different embodiment, the clustering is accomplished by graph pruning and the formation of connected components. For example, in one embodiment, given the graph with keywords as nodes and edges representing the similarities of the keyword pairs, edges are pruned if their values are less than some threshold similarity value. Then, the connected components of the graph are calculated. (A connected component of a graph is a subset of nodes of the graph in which every node of the subset is reachable by every other node of the subset. This reflects the desired "loose association" of keywords, in that the keywords need not all be directly connected to all the other keywords in the connected component.) Each connected component is considered to represent a topic.

In some embodiments, a maximum topic size is defined, and if a connected component contains more keywords than the maximum topic size, its graph is recursively split by first increasing the minimum similarity degree used to prune graph edges and then forming sub-connected components within the connected component being split. Thus, the same algorithm for pruning and formation of connected components can be applied to achieve topics and sub-topics (represented by connected components and sub-connected components) of different granularities, simply by increasing the similarity degree for pruning used at each level of granularity. The topics generated using connected components are "consistent" in the sense that if a pair of keywords x and y are in the same connected component (topic) with pruning threshold t, they are also in the same connected component with pruning threshold t'<t.

Figure 2:
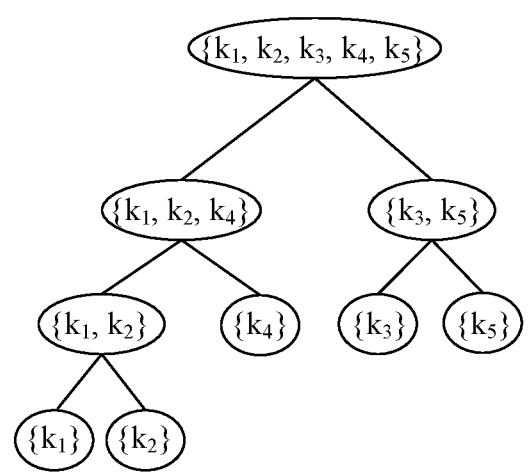
FIG. 2 illustrates an example topic tree.

As a result of this consistency, the topic graph generation module 106 can construct a topic tree where the nodes correspond to topics and the depth in the tree corresponds to increasing similarity thresholds. The leaves consist of single keywords. The root is a topic that contains all keywords. In between the root and the leaves are topics of decreasing size (when descending the tree), and the tree encodes how topics merge together to form larger topics. FIG. 2 illustrates a simple example of one such tree, for a hypothetical set of five keywords, $k_1$, $k_2$, $k_3$, $k_4$, and $k_5$.

A library (such as Apache Spark™) can be used to compute the connected components of graphs with hundreds of millions of edges (from the complete database of SERP data) and produce a database of topics. This database can then be searched using a set of domains, or a set of keywords of interest.

Listing 3 contains pseudocode to recursively compute topics and subtopics from a graph of keywords, given known similarities of pairs of keywords, a given pruning threshold for similarity, and a maximum topic size, as described above:

Listing 3
```
def compute_topics_from_similarities(similarities,
    threshold):
    g=graph(similarities)
    return compute_topics(g, threshold)
def compute_topics(graph, threshold):
    # remove edges with weight (similarity) less than
        threshold
    pruned_graph=prune_edges(graph, threshold)
    topics=connected_components(pruned_graph)
    final_topics=[ ]
    # If a topic is too large we can recursively split it with
    # a larger threshold. This is equivalent to using different
    # thresholds in different parts of the graph. Specifically,
    # larger thresholds in more densely connected regions.
    for topic in topics:
        if size(topic)>MAX_TOPIC_SIZE:
            # get subgraph with only vertices in topic
            topic_graph=subgraph(pruned_graph, topic)
            new_thresh=threshold+THRESHOLD_INCRE-
                MENT
            new_topics=compute_topics (topic_graph, new-
                _thresh)
            final_topics.extend(new_topics)
        else:
            final_topics.append(topic)
    return final_topics
```

In another embodiment, the topic graph generation module 106 computes topics by recursively removing the nodes with the highest "betweenness centrality" (e.g., those nodes with betweenness centralities higher than a given threshold). (The betweenness centrality for a node of the graph measures how often that node is found on a shortest path in the graph between two other nodes, such as a count of how often that occurs for the node.) Because this can be too slow when executed on an entire keyword graph, in one embodiment a first pass is performed with the technique of Listing 3, and then the betweenness centrality technique is used to split large topics (the graphs for which are still much smaller than the original graph). Listing 4 contains pseudocode for topic graph generation on a given graph (the argument "graph") using betweenness centrality:

Listing 4
```
def bc_topics(graph):
    # Assume bc is a list of nodes sorted descending by
    # betweenness centrality.
    bc=betweeness_centrality(graph)
    i=0
    removed=[ ]
    pruned_graph=graph
    topics=connected_components(pruned_graph)
    # Keep removing central nodes until the topic splits.
    while len(topics)==1:
        most_central_node=bc[i]
        pruned_graph=
        pruned_graph.remove_node(most_central_node)
        removed.append(most_central_node)
        topics=connected_components(pruned_graph)
        i+=1
    final_topics=[ ]
    for topic in topics:
        # Add ambiguous keywords to all subtopics
        topic.extend(removed)
        if size(topic)>MAX_TOPIC_SIZE:
            topic_graph=subgraph(graph, topic)
            new_topics=bc_topics (topic_graph)
            final_topics.extend(new_topics)
        else:
            final_topics.append(topic)
    return final_topics
```

If a node in the topic graph has a high betweenness centrality value, that may indicate that the node's corresponding keyword is ambiguous. Accordingly, in some embodiments such nodes are placed into the multiple related sub-topics created by splitting a topic, as in Listing 4 above.

In embodiments such as that of Listing 1, with the topic clusters formed, the topic graph generation module 106 connects the nodes according to their topic similarities. In one embodiment, the topic graph generation module 106 computes a topic similarity score for each pair of topic clusters, with scores over a threshold indicating that the corresponding pair of topic nodes is connected.

In some embodiments, such as that of Listing 1, the keywords of the topic clusters are further sub-clustered using a different clustering algorithm, such as K-means clustering. The sub-clustering of the keywords for a topic cluster results in the identification of sub-sections for the topic defined by the topic cluster. In one embodiment, the similarity function for this sub-clustering keywords between any two keywords $k_1$ and $k_2$ is based on both (a) intersection of the URLs in results($k_1$) and in results($k_2$), and (b) natural language operations (e.g., NLP-based comparisons) on the keywords, such as a comparison of embeddings from NLP models (e.g., BERT) for $k_1$ and $k_2$. In such an embodiment, the primary clusters and sub-clusters may be viewed as representing different levels of granularity of content. For example, if a content author 112 is creating content that is an article on a web page, the primary clusters correspond to the general theme of the article, and the sub-clusters correspond to concepts for which to provide additional detail in sub-sections of the article.

Once formed, the topic graph 105 provides the content author 112 with a sense of the concepts to include in an article or other piece of content so that the search engine 130 will be likely to rank it highly in its search results when a content viewer 114 issues a query with a particular keyword. The loose affiliation of the keywords in a given cluster allows a single cluster to describe multiple concepts that are in the same general topic area and thus of likely interest to a content viewer, but that may nonetheless represent a different angle on the topic. For example, if a topic has the keywords "401k", "what is a 401k", "401k contribution limit", and "401k vs IRA", this indicates that an article is more likely to rank highly in the search engine 130 if it addresses each of these various concepts (e.g., explaining what a 401(k) retirement account is, what the contribution limit is, and how a 401(k) compares to an IRA. In embodiments with sub-clustering, the sub-clusters represent appropriate sub-topics to include in the content, e.g., as first-level headings for the content. For example, in a real-world example with a greater number of keywords in the above topic cluster, "what is a 401", "401k contribution limit", and "401k vs IRA" might all be placed into separate sub-clusters.

A content author can use the topic graph 105 to write a new piece of content from scratch to rank highly for a given topic of interest. A content author may also use the topic graph 105 to revise an existing article, e.g., by reviewing the list of topics identified for the article and use the information about those topics to rewrite the article to attempt to improve its rank for those topics.

In some embodiments, the topic graph generation module 106 additionally annotates the topic clusters (via annotation of their constituent search result links) with additional metadata that can later be searched or otherwise analyzed. For example, the metadata may include page types (e.g., "article") for the links, search intent (e.g., "commercial") for the query leading to the link, and/or keyword category ("/Vehicles/Vehicle Repair & Maintenance") for the keyword.

In some embodiments, the topic graph generation module 106 includes a topic value computation module 107 that computes a value of a particular topic for a content author 112. The value provides a way to rank the particular topics for use by the author. The value may be computed as a function of factors such as expected numbers of conversions associated with the keywords of the topic, search volume, authority of the content author 112 (and/or its competitors) for that particular topic, competitiveness of the keywords associated with the topic, and/or estimated conversion rate of the topic.

In one embodiment, the computed value is an estimate of a return on investment (ROI) for the author in creating the content when the content is made available to content viewers 114. In this embodiment, the ROI of a topic t having keywords k within a particular domain d is computed as follows:

ROI(t, d)
= revenue(t, d)−cost(t, d)
= visits(t, d)*revenue_per_visit(t, d)−cost(t, d)
= ($\Sigma_{k \in t}$ searches(k)*searchCTR(k,t,d))*(conversion_rate(t,d)
  *revenue_per_conversion(t, d))−cost(t,d)
= ($\Sigma_{k \in t}$ aearches(k)*$\Sigma_{rank}$p(rank|t,d)*CTR(rank, k, t))
  *(conversion_rate(t, d)*revenue_per_conversion(t, d))−cost(t, d)

The various factors in the ROI computation of the above embodiment (for example) can in turn be estimated as follows:

searches(k) is the search volume for keyword k in the search engine 130, and may be computed based on various databases and APIs provided by the search engine 130 or others.

To compute CTR(rank, k, t), CTR representing a click-through rate of k within search results, the content analysis system 100 gathers data of the form (k, rank, URL, CTR) from the search engine 130 (e.g., in the case of the Google™ search engine, via Google Search Console). This can be used to estimate CTR at position m averaged over all keywords. For a particular keyword k of interest there may not be sufficient CTR estimates in the collected data set. Accordingly, the content analysis system 100 trains a model to predict the CTR at a particular rank given a particular topic t and keyword k; in some embodiments multiple models are trained to predict CTR for different segments of the keyword search volume, such as the head or the long tail, or the search volume is given as an input to the trained model. In one embodiment, this model is a deep regressor that uses embeddings of the specific keyword and/or topic, as well as an embedding of the rank. The model may be set up to predict a topic-specific adjustment to the topic-independent estimate: CTR_estimate(rank)+CTR_adjustment(rank, k, t), where CTR_adjustment comes from the model.

To compute p(rank|t, d), the topic graph generation module 106 can predict a probability distribution over ranks p(rank|t, d) for the specific topic t and domain d. There are many factors that could be incorporated into this estimation; in one embodiment, a model of the domain's authority for the topic (topical authority) is used. In this embodiment, a dataset of (keyword, rank) tuples is gathered for the domain d, including a sample of keywords where the domain has rank>MAX_OBSERVABLE (where MAX_OBSERVABLE is the highest rank that can be observed in the SERP data). The content analysis system 100 trains a model to predict the highest rank of the domain d for each keyword k, such as using a deep ordinal regression model with keyword embeddings. The predicted ranks can be used for individual keywords to estimate p(rank|t, d).

To predict conversion_rate(t, d), the topic graph generation module 106 trains a domain-specific model. Training data is gathered by linking URLs u on pages of the domain to topics t, and making the target variable the observed conversion rate within the domain for u. The features could be embeddings of the topic keywords and the model a deep regressor or learning to rank model.

The revenue_per_conversion can be assumed to be independent of the topic t, so that the observed data can simply be used. In other embodiments, a model conditioned on topic is trained in a manner similar to the above-described training of the domain-specific model. In some embodiments, the cost may vary based on the goal. For example, the cost may be made proportional to the expected ROI, so as to keep the expected ROI positive. Or, for situations in which the performance of a piece of content for a particular topic is subpar, the cost may be estimated so as to improve the performance of the piece of content.

Similarly, to compute cost(t, d), a fixed cost per piece of content may be assumed, independent of the topic t, or (in other embodiments) a model is trained conditioned on the topic.

These ROI-prediction techniques focus on predicting ROI at some fixed point in the future, such as one year. After a piece of content is published, the estimates may be replaced with the observed values to compute the true ROT, and this data can then be used to update the computed models, thereby leading to a further improvement in model accuracy.

In some embodiments, the content analysis system 100 further includes a topic graph searching module 108 that a content author 112 may use to gain insight into how to write or revise a given piece of content. The topic graph searching module 108 provides a user interface for the content author 112 to use to search. The content author 112 can specify topic search criteria, and the topic graph searching module 108 accordingly filters the topic graph 105 according to those criteria and presents the filtered graph to the content author 112. Additionally, a content author 112 can receive personalized recommendations (without explicitly performing a search) for topics that may be of interest. The recommended topics may be selected based on topical authority, predicted ROI, topics for which competitors are currently ranking, and/or how existing content of the content author ranks for the topic, as some examples. For example, a content author could see a list of opportunities for new content sorted by ROI, or a list of opportunities to improve existing content that is not optimized for the topic.

In one embodiment, the filtering criteria include the following:
(a) Domains/link patterns: Topic clusters are filtered out unless the links (e.g., URLs) in search results of the keywords of the cluster have at least some threshold degree (e.g., count, or percentage) of matches to the given domains/patterns, potentially with constraints on the rank on the SERP, e.g., only topics where a particular domain ranks on the first page.
(b) Seed keywords: Topic clusters are filtered out unless they have at least some threshold degree of keywords that are a given number h of hops away from the seed keyword s in a URL graph. For example, if h=1, first URLs that rank for s are identified, then other keywords that are one hop away from s in a URL graph, and that also rank for the identified URLs, are selected, and others are filtered out.
(c) Page types: Topic clusters are filtered out unless at least some threshold degree of the links in the result sets of the topic cluster refer to content of a given page type.
(d) Search intent: Topic clusters are filtered out unless at least some threshold degree of the keywords of the topic cluster have a given search intent.
(e) Keyword categories: Topic clusters are filtered out unless at least some threshold degree of the keywords of the topic cluster have a given keyword category.

ALTERNATIVE EMBODIMENTS

In some embodiments, the graph is composed of links (e.g., URLs) rather than keywords, and the similarity function between two nodes/links is defined based on similarities of the keywords for which the links rank highly. A connected component formation algorithm similar to that of Listing 3 can then be used to form the connected components that correspond to topics, and the keywords for a given topic are the union of the keywords for which the constituent links rank highly.

The above-described techniques provide increased accuracy when discovering and modeling different topics, through representing keywords using SERPs, and allowing topics to contain loosely-associated keywords so as to better model the scope of the topics.

Figure 3:
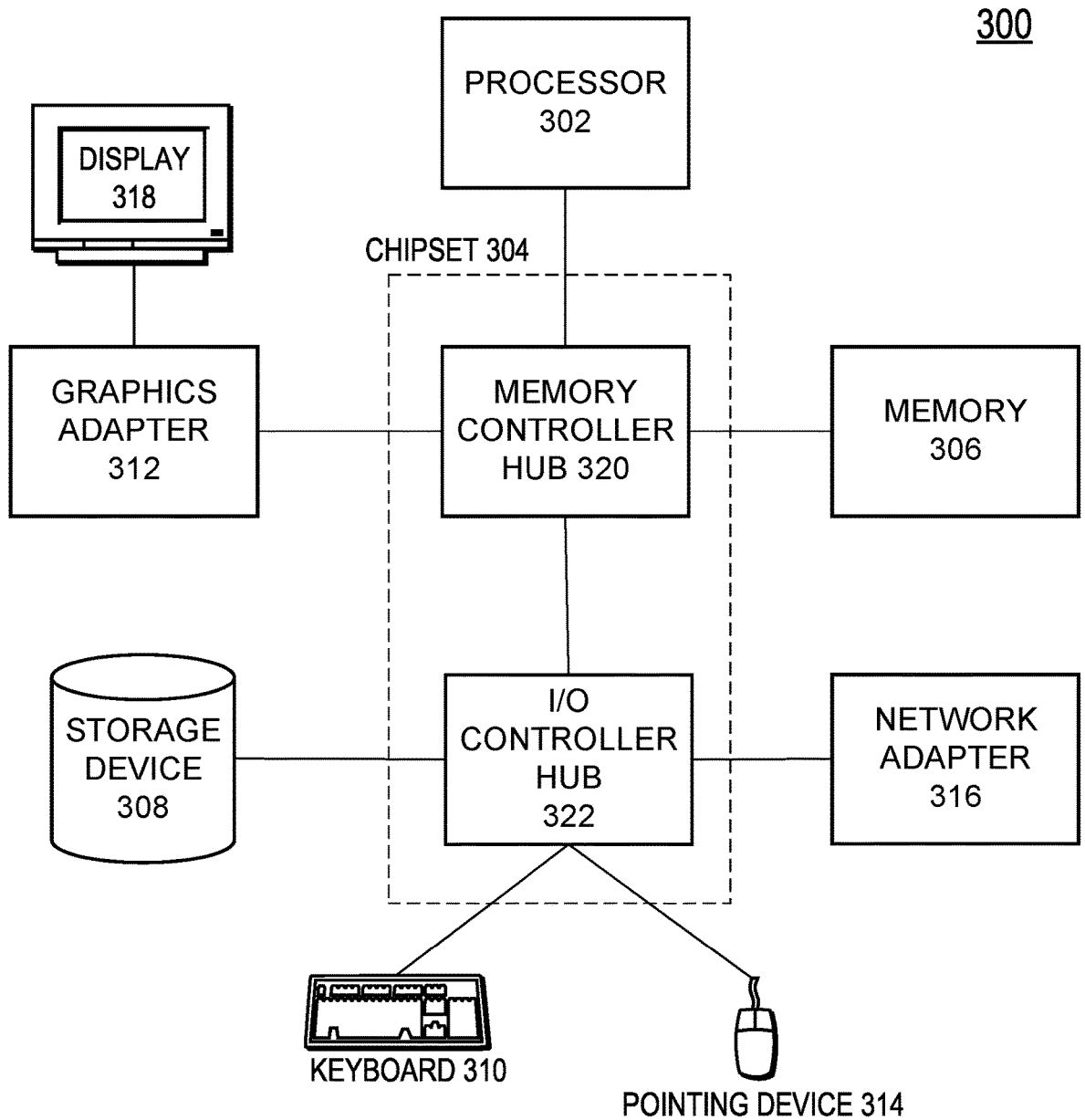
FIG. 3 is a high-level block diagram illustrating physical components of a computer used as part or all of the content analysis system, client device, web server, or search engine from FIG. 1, according to one embodiment.

FIG. 3 is a high-level block diagram illustrating physical components of a computer 300 used as part or all of the content analysis system 100, client device 110, web server 120, or search engine 130 from FIG. 1, according to one embodiment. Illustrated are at least one processor 302 coupled to a chipset 304. Also coupled to the chipset 304 are a memory 306, a storage device 308, a graphics adapter 312, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 acting as a server may lack a graphics adapter 312, and/or display 318, as well as a keyboard or pointing device. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory; functions performed by a single system component may instead be performed by multiple components, and functions performed by multiple components may instead be performed by a single component.

Some portions of the above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The algorithms and operations may be implemented using sequential processing techniques, and/or with parallel processing technologies such as multi-processors, graphics processing units (GPUs), or tensor processing units (TPUs). The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein, which are set forth in the following claims.

What is claimed is:

1. A computer-implemented method of generating a topic graph for creating content, the computer-implemented method comprising:
    accessing an initial rank of a website on a search engine results page (SERP) when queries about a topic of interest are entered into a search engine, the website created by a content author and comprising content about the topic of interest:
    obtaining a set of keywords occurring in queries of at least a threshold amount of users of the search engine;
    obtaining a set of SERP items, each SERP item corresponding to a query of a viewer and a list of links returned by the search engine for the query, the queries including the set of keywords;
    generating a topic graph using the SERP items, the generating comprising:
        organizing the set of keywords into topic clusters, each topic cluster composed of keywords having at least a threshold degree of similarity to that topic cluster but not necessarily to other keywords of that topic cluster;
    receiving a set of topic search criteria from the content author, the search criteria including a seed keyword related to the topic of interest;
    filtering topics of the topic graph according to the search criteria, the filtering comprising:
        accessing a URL graph filtering the topics of the topic graph according to the search criteria, and
        filtering out one or more topics from the topic graph, each topic filtered unless the topic has at least some threshold degree of keywords that are a given number of hops away from the seed keyword in the URL graph;
    providing the filtered topics of the topic graph for display to the content author; and
    responsive to the content author publishing modified content to the website based on the provided filtered topics, accessing a modified rank of the website on the SERP when queries about the topic of interest are entered into the search engine, the modified rank higher than the initial rank.

2. The computer-implemented method of claim 1, wherein the organizing is performed using a first similarity function that analyzes intersections of links in the lists of links of a pair of keywords.

3. The computer-implemented method of claim 2, further comprising computing sub-clusters for the topic clusters, the sub-clustering using a second similarity function different from the first similarity function, the second similarity function analyzing natural-language operations on the keywords.

4. The computer-implemented method of claim 1, wherein the organizing is performed using a similarity function that computes keyword similarities using embeddings of SERP items for keywords.

5. The computer-implemented method of claim 1, wherein the organizing comprises:
    computing edge values for edges of the topic graph by applying a similarity function to pairs of keywords associated with pairs of nodes of the topic graph; and
    identifying connected components of the topic graph as topics by pruning edges with edge values less than a first threshold similarity value.

6. The computer-implemented method of claim 1, further comprising:
    identifying connected components having greater than a threshold number of nodes; and
    recursively identifying sub-connected components of the identified connected components as sub-topics by pruning edges with edge values less than threshold similarity values greater than a first threshold similarity value.

7. The computer-implemented method of claim 1, wherein the organizing comprises:
    computing betweenness centrality values for nodes of the topic graph;
    modifying the topic graph by removing nodes having betweenness centrality values greater than a given threshold; and
    computing the topics based on the modified topic graph.

8. The computer-implemented method of claim 1, further comprising computing topic returns on investment (ROI) for the topic clusters.

9. The computer-implemented method of claim 8, further comprising:
ranking topic clusters of the topic graph according to topic ROI; and
displaying the ranked topic clusters to a content author according to the ranking.

10. The computer-implemented method of claim 8, wherein computing a topic ROI for a topic cluster comprises computing a click-through rate (CTR).

11. The computer-implemented method of claim 10, wherein computing the CTR uses a model trained to predict CTR at a particular search rank given a keyword k and a topic t.

12. The computer-implemented method of claim 10, further comprising training a plurality of models, each model of the plurality of models trained to predict CTR for a different segment of keyword search volume.

13. A computer-implemented method of generating a topic graph for creating content, the computer-implemented method comprising:
accessing an initial rank of a website on a search engine results page (SERP) when queries about a topic of interest are entered into a search engine, the website created by a content author and comprising content about the topic of interest;
obtaining a set of keywords occurring in queries of at least a threshold amount of users of the search engine;
obtaining a set of SERP items, each SERP item corresponding to a query of a viewer and a list of links returned by the search engine for the query, the queries including the set of keywords;
generating a topic graph using the SERP items, the generating comprising:
organizing the set of keywords into topic clusters, each topic cluster composed of keywords having at least a threshold degree of similarity to that topic cluster but not necessarily to the keywords of that topic cluster, wherein the organizing is performed using a first similarity function that analyzes intersections of links in the lists of links of a pair of keywords;
providing the topic graph for display to the content author, and
responsive to the content author publishing modified content to the website based on the provided topic graph, accessing a modified rank of the website on the SERP when queries about the topic of interest are entered into the search engine, the modified rank higher than the initial rank.

14. The computer-implemented method of claim 13, further comprising:
receiving a set of topic search criteria from a content author;
filtering the topics of the topic graph according to the search criteria; and
providing the filtered topics of the topic graph for display to the content author.

15. The computer-implemented method of claim 14, wherein the search criteria include at least one of: URL link patterns, seed keywords, page types, search intent, or keyword categories.

16. The computer-implemented method of claim 15, wherein the search criteria include a seed keyword, the filtering comprising:
accessing a URL graph filtering the topics of the topic graph according to the search criteria; and
filtering out a topic from the topic graph unless the topic has at least some threshold degree of keywords that are a given number of hops away from the seed keyword in the URL graph.

17. The computer-implemented method of claim 13, further comprising computing sub-clusters for the topic clusters, the sub-clustering using a second similarity function different from the first similarity function, the second similarity function analyzing natural-language operations on the keywords.

18. The computer-implemented method of claim 13, further comprising computing topic returns on investment (ROI) for the topic clusters.

19. A computer-implemented method of generating a topic graph for creating content, the computer-implemented method comprising:
accessing an initial rank of a website on a search engine results page (SERP) when queries about a topic of interest are entered into a search engine, the website created by a content author and comprising content about the topic of interest;
obtaining a set of keywords occurring in queries of at least a threshold amount of users of the search engine;
obtaining a set of SERP items, each SERP item corresponding to a query of a viewer and a list of links returned by the search engine for the query, the queries including the set of keywords;
generating a topic graph using the SERP items, the generating comprising:
organizing the set of keywords into topic clusters, each topic cluster composed of keywords having at least a threshold degree of similarity to that topic cluster but not necessarily to other keywords of that topic cluster, wherein the organizing comprises:
computing edge values for edges of the topic graph by applying a similarity function to pairs of keywords associated with pairs of nodes of the topic graph, and
identifying connected components of the topic graph as topics by pruning edges with edge values less than a first threshold similarity value;
providing the topic graph for display to the content author; and
responsive to the content author publishing modified content to the website based on the provided topic graph, accessing a modified rank of the website on the SERP when queries about the topic of interest are entered into the search engine, the modified rank higher than the initial rank.

20. The computer-implemented method of claim 19, further comprising:
receiving a set of topic search criteria from a content author;
filtering the topics of the topic graph according to the search criteria; and
providing the filtered topics of the topic graph for display to the content author.

21. The computer-implemented method of claim 19, further comprising computing topic returns on investment (ROI) for the topic clusters.

22. A computer-implemented method of generating a topic graph for creating content, the computer-implemented method comprising:
accessing an initial rank of a website on a search engine results page (SERP) when queries about a topic of interest are entered into a search engine, the website created by a content author and comprising content about the topic of interest;
obtaining a set of keywords occurring in queries of at least a threshold amount of users of the search engine;
obtaining a SERP items, each SERP item corresponding to a query of a viewer and a list of links returned by the search engine for the query, the queries including the set of keywords;
generating a topic graph using the SERP items, the generating comprising:
 organizing the set of keywords into topic clusters, each topic cluster composed of keywords having at least a threshold degree of similarity to that topic cluster but not necessarily to other keywords of that topic cluster;
 identifying connected components having greater than a threshold number of nodes; and
 recursively identifying sub-connected components of the identified connected components as sub-topics in the topic graph by pruning edges with edge values less than a first threshold similarity value; and
providing the topic graph comprising sub-topics for display to the content author; and
responsive to the content author publishing modified content to the website based on the provided topic graph, accessing a modified rank of the website on the SERP when queries about the topic of interest are entered into the search engine, the modified rank higher than the initial rank.

23. The computer-implemented method of claim 22, further comprising:
receiving a set of topic search criteria from a content author;
filtering the topics of the topic graph according to the search criteria; and
providing the filtered topics of the topic graph for display to the content author.

24. The computer-implemented method of claim 22, further comprising computing topic returns on investment (ROI) for the topic clusters.

25. A computer-implemented method of generating a topic graph for creating content, the computer-implemented method comprising:

accessing an initial rank of a website on a search engine results page (SERP) when queries about a topic of interest are entered into a search engine, the website created by a content author and comprising content about the topic of interest;
obtaining a set of keywords occurring in queries of at least a threshold amount of users of the search engine;
obtaining a set of SERP items, each SERP item corresponding to a query of a viewer and a list of links returned by the search engine for the query, the queries including the set of keywords;
generating a topic graph using the SERP items, the generating comprising:
 organizing the set of keywords into topic clusters, each topic cluster composed of keywords having at least a threshold degree of similarity to that topic cluster but not necessarily to other keywords of that topic cluster, wherein the organizing comprises:
  computing betweenness centrality values for nodes of the topic graph,
  modifying the topic graph by removing nodes having betweenness centrality values greater than a given threshold, and
  computing the topics based on the modified topic graph; and
providing the topic graph comprising sub-topics for display to the content author; and
responsive to the content author publishing modified content to the website based on the provided topic graph, accessing a modified rank of the website on the SERP when queries about the topic of interest are entered into the search engine, the modified rank higher than the initial rank.

26. The computer-implemented method of claim 25, further comprising:
receiving a set of topic search criteria from a content author;
filtering the topics of the topic graph according to the search criteria; and
providing the filtered topics of the topic graph for display to the content author.

27. The computer-implemented method of claim 25, further comprising computing topic returns on investment (ROI) for the topic clusters.

* * * * *